(12) United States Patent
Flanagan

(10) Patent No.: US 9,307,465 B2
(45) Date of Patent: *Apr. 5, 2016

(54) METHOD AND APPARATUS FOR DETERMINING THE IDENTITY OF A FEMTO CELL

(75) Inventor: Michael Joseph Flanagan, Chester, NJ (US)

(73) Assignee: Viavi Solutions UK Limited, Berkshire (GB)

( * ) Notice: Subject to any disclaimer, the term of this patent is extended or adjusted under 35 U.S.C. 154(b) by 79 days.

This patent is subject to a terminal disclaimer.

(21) Appl. No.: 13/173,923

(22) Filed: Jun. 30, 2011

(65) Prior Publication Data
US 2013/0005326 A1    Jan. 3, 2013

(51) Int. Cl.
*H04W 36/04* (2009.01)
*H04W 84/04* (2009.01)

(52) U.S. Cl.
CPC ............ *H04W 36/04* (2013.01); *H04W 84/045* (2013.01)

(58) Field of Classification Search
USPC .......... 370/331, 350; 455/456.1, 456.5, 456.6
See application file for complete search history.

(56) References Cited

U.S. PATENT DOCUMENTS

| | | | | |
|---|---|---|---|---|
| 5,394,158 A * | 2/1995 | Chia | ............................. | 342/457 |
| 6,201,803 B1 * | 3/2001 | Munday et al. | ............... | 370/350 |
| 7,062,600 B2 * | 6/2006 | Yoo | ............................... | 711/103 |
| 7,391,753 B2 * | 6/2008 | Tiedemann et al. | ........... | 370/331 |
| 2010/0150109 A1 * | 6/2010 | Bradley et al. | ................ | 370/331 |
| 2010/0234028 A1 * | 9/2010 | Narasimha et al. | ........... | 455/437 |
| 2011/0281574 A1 * | 11/2011 | Patel et al. | .................. | 455/422.1 |
| 2012/0302261 A1 * | 11/2012 | Tinnakornsrisuphap et al. | ......................... | 455/456.4 |

FOREIGN PATENT DOCUMENTS

| | | |
|---|---|---|
| WO | 2010081658 | 7/2010 |
| WO | 2010081659 | 7/2010 |
| WO | 2010083943 | 7/2010 |

OTHER PUBLICATIONS

"PN Offset in CDMA," Telecomm Cellular Technology Concepts, http://cellular-technology-concepts.blogspot.com/2010/10/pn-offset-in-cdma.html.*
"PN offset in CDMA," Oct. 8, 2010, http://cellular-technology-concepts.blogspot.com/2010/10/pn-offset-in-cdma.html.*

* cited by examiner

*Primary Examiner* — Kent Chang
*Assistant Examiner* — Nathan Brittingham
(74) *Attorney, Agent, or Firm* — Harrity & Harrity, LLP

(57) ABSTRACT

A femto cell is located within a macro cell of a wireless communication system. A method of identifying the femto cell comprises: determining at least one timing difference, the at least one timing difference being observed for communications between a wireless communication unit and each of a femto cell and at least one macro cell; and comparing the at least one observed timing difference to reference timing difference data. The identity of the femto cell may allow the location of the femto cell to be set as a geographical location for a wireless communication device that is within the footprint of the femto cell. The identity of the femto cell may allow hand in of an ongoing call, from the macro cell to the femto cell.

20 Claims, 4 Drawing Sheets

METHOD AND APPARATUS FOR DETERMINING THE IDENTITY OF A FEMTO CELL

CROSS REFERENCE TO RELATED APPLICATIONS

This application is related to a U.S. patent application Ser. No. 13/173,950, now U.S. Pat. No. 8,626,176, entitled METHOD AND APPARATUS FOR DERIVING FEMTO CELL TIMING INFORMATION, by Michael J. Flanagan, filed currently herewith.

FIELD OF THE INVENTION

The field of the invention relates to a method and apparatus for determining the identity of a femto cell. The femto cell may be within the footprint of a macro cell of a wireless communication network. The identity information may be used for a variety of purposes. These include determining the location of a wireless subscriber unit, and supporting hand-in of a call from a macro cell to the femto cell.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ generation of wireless communications has generally been developed to support macro-cell mobile phone communications. Such macro cells utilise high power base stations to communicate with wireless communication units within a relatively large geographical coverage area. These base stations are called 'NodeBs', in 3GPP.

Typically, mobile/portable wireless communication units, or User Equipment (UEs) as they are often referred to in 3 G, communicate with a Core Network (CN) of the 3G wireless communication system. This communication is via a Radio Network Subsystem (RNS). A wireless communication system typically comprises a plurality of Radio Network Subsystems. Each Radio Network Subsystem comprises one or more cells, to which UEs may attach and thereby connect to the network.

Lower power femto cells (or pico-cells) are a recent development within the field of wireless cellular communication systems. These lower power cells have a smaller coverage area than Node Bs. The term femto cells is used hereafter to also encompass pico-cells or similar.

Femto cells are effectively communication coverage areas supported by low power base stations, which may also be referred to as Home NodeBs (HNBs). These femto cells are intended for use within a relatively small area of the cellular network. They may support communications to UEs in a restricted, for example 'in-building', environment.

Typical applications for such femto Home NodeBs include residential and commercial, e.g. office, locations, and communication 'hotspots'. In these uses, a Home NodeB can be connected to a core network of a communication system via, for example, the Internet. A broadband connection or the like may provide this connection.

In this manner, femto cells can be provided in a simple, scalable deployment. They can be used in specific in-building locations where, for example, network congestion at the macro-cell level may be problematic. Significantly, the majority of Home NodeBs are likely to be owned and deployed by members of the public, as opposed to a Network Operator owning a Node B.

One task that needs to be performed within communication networks is 'Geo-location'. Geo-location is the identification of the real-world geographical location of, say, a UE or the like. Geo-location of UEs can be performed by using network and mobile measurement data for nearby cells. A macro cell typically comprises a substantially unique Primary Scrambling Code (PSC) within its location area. A macro cell may therefore be differentiated from other macro cells, and thereby identified, based on its Location Area Code (LAC) and PSC. Accordingly, by identifying nearby macro cells for a UE, an approximate location of the UE may be determined, based on mobile measurement data for the identified macro cells. However, because of the relatively large coverage area of macro cells, this approach only provides some improvement in the degree of accuracy in identifying the location of the UE.

The use of femto cells for geo-location constitutes a special case. This is because femto cells have very limited range, unlike macro cells, and there can be many femto cells within the physical footprint of a single macro cell. Thus femto cells offer the potential for a higher degree of accuracy in identifying the locations of UEs. However, attempts to use femto cells for geo-location of a UE have tended to experience difficulties, for example:

(i) Femto cells are difficult to distinguish from one another in practice. This difficulty arises since they typically either share a single common Primary Scrambling Code (PSC), or a small number of shared PSCs. This can lead to considerable ambiguity in differentiating one femto cell from another.

(ii) The relatively small number of femto cells has meant that a UE is typically only in contact with a femto cell for much less time than it has a macro cell available. Hence designers have tended to favour geo-location methods that rely on macro cells, rather than femto cells.

Another task that must be performed within communication networks is the 'hand off' of a call from one base station to another. The issue of call hand-off is significant, because users of wireless communication devices wish to make seamless calls. This is not always possible in prior art systems. Call hand-off from or to a femto cell is similarly desirable.

Femto cells have often been used to allow a UE to initiate a call, if it is within range of the femto cell when it needs to start a call. Some prior art systems do also allow a call that has been initiated through a femto cell to 'hand out', when the UE moves out of range of the femto cell and must communicate through a macro cell. This means that, without the call dropping, the macro cell can take over support of an ongoing call that was previously supported by a femto cell.

However, it is more difficult to 'hand in' an ongoing call to the HomeNode B of a femto cell, if the UE moves within range of the femto cell whilst there is an on-going call through the macrocell. This problem of 'handing-in' an ongoing call arises partly because of the issue of PSC usage by HomeNodeBs, which makes it difficult for the UE to identify the femto cell that has recently come within range. Some prior art systems are believed to try to hand in an ongoing call to every known femto cell in the footprint of the macro cell. However, this does not represent an optimum use of resources, especially when there are many femto cells per macro cell. Other systems are believed to use GPS location information provided by the UE to attempt to identify exactly which femto cell is in the vicinity, and then hand in to that femto cell. However, this may be inaccurate, for example because there is poor GPS coverage within a building, where the femto cell is located. It also requires that GPS be fitted in the handsets, which also causes additional battery drain.

Thus, there is a need for an improved method and apparatus for identifying a femto cell of a wireless communication network, whereby at least some of the above mentioned problems with known techniques are substantially alleviated.

SUMMARY OF THE INVENTION

These and other features, advantages, and objects of the present invention will be further understood and appreciated by those skilled in the art by reference to the following specification, claims, and appended drawings. Accordingly, the invention seeks to mitigate, alleviate or eliminate one or more of the above-mentioned disadvantages singly or in any combination.

In accordance with the invention, a method of identifying a femto cell may comprise determining at least one observed timing difference, for communications between a wireless communication unit and each of a femto cell and at least one macro cell, and comparing the at least one observed timing difference to reference timing difference data, to identify the femto cell. The observed timing data may be received from the wireless communication unit, and the determination may be based at least partly on the observed timing data.

The observed timing data may comprise a timing offset value for the femto cell and a timing offset value for the at least one macro cell, and an observed timing difference value may be determined for the femto cell and the at least one macro cell, by subtracting one of the timing offset values from the other.

The reference timing difference data may comprise reference timing difference values for one or more femto cells located at least partially within individual macro cells. In this case, the at least one macro cell with which the wireless communication unit can communicate may be identified, and the at least one observed timing difference can be compared to reference timing difference values for one or more femto cells, the one or more femto cells being at least partially within the at least one macro cell. The femto cell may be identified by identifying a reference timing difference value closest to the at least one observed timing difference.

The method of the invention may be applied to observed timing differences between a femto cell, and a macro cell that has a strongest signal strength for the wireless communication unit. It may also or instead be applied to a femto cell, and each macro cell indicated as having a signal strength above a threshold value for the wireless communication unit.

The method may be performed in response to receiving an indication from the wireless communication unit of the presence of a femto cell. In particular, the method may be performed in response to the receipt of a measurement report from the wireless communication unit, the measurement report comprising observed timing data for at least one femto cell using a femto cell primary scrambling code.

The reference timing difference data may comprise mapped data, the mapped data being created from data obtained by multiple wireless communication units of the cellular wireless communication system. Each of the multiple wireless communication units may use a geo-location subsystem to identify a current location, the current location being stored together with observed timing difference data, measured at the current location.

A method of determining the geographical location of a wireless communication unit may comprise using the method of identifying a femto cell, setting a geographical location of the identified femto cell as a geographical location for the wireless communication unit.

A method of handing in an on-going call from a wireless communication unit to a femto cell of a cellular wireless communication system may comprise using the method of identifying a femto cell, and handing in an on-going call from the wireless communication unit to the femto cell.

The method of identifying a femto cell may be implemented within a network element, which is part of the network of the communication system. Alternatively, a wireless mobile communication device may itself perform the method. A network element may comprise at least one signal processing module arranged to determine at least one timing difference, the at least one timing difference being observed for communications between a wireless communication unit and each of a femto cell and at least one macro cell, and arranged to compare the at least one observed timing difference to reference timing difference data, to identify the femto cell. The network element may be arranged to set a location of the identified femto cell as a geographical location for the wireless communication unit, which may involve accessing a network configuration file, the network configuration file comprising latitude and longitude data for the at least one femto cell. The network element may be arranged to hand-in an on-going call from a macro cell to the identified femto cell, which may involve accessing a femto cell configuration file, the femto cell configuration file comprising information identifying femto cells, including femto cell names or labels.

A tangible non-transitory computer program product having executable program code stored therein for programming signal processing logic to perform the method for identifying a femto cell, may be provided. The tangible computer program product may comprise at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

BRIEF DESCRIPTION OF THE DRAWINGS

Embodiments of the invention will be described, by way of example only, with reference to the accompanying drawings, in which.

DETAILED DESCRIPTION

Examples of the invention will be described in terms of a method and apparatus of identifying a femto cell of a Universal Mobile Telecommunications System (UMTS™) cellular wireless communication network. However, it will be appreciated by a skilled artisan that the inventive concept herein described may equally be implemented within cellular communication networks adapted in accordance with alternative wireless communication technologies and standards.

In a number of applications, a network element in accordance with examples of the invention may be adapted to perform a method for identifying a femto cell. The method comprises determining at least one observed timing difference. The at least one observed timing difference is for communications between a wireless communication unit and each of a femto cell and at least one macro cell. The at least one observed timing difference is compared to reference timing difference data to identify the femto cell.

In preferred embodiments, the identity of the femto cell may then be used in further steps. The geographical location for the wireless communication unit may be set to a location associated with the identified femto cell. An ongoing call may be handed in to the identified femto cell.

As described below in greater detail, the use of observed timing differences between a femto cell and one or more macro cells in this manner enables one femto cell located within a footprint of the macro cell to be differentiated from other femto cells located within the footprint of the macro cell. Accordingly, by comparing the observed timing difference for an observed femto cell to reference timing difference data, the observed femto cell may be identified.

Furthermore, femto cells have a limited range. So the geographical location of the wireless communication unit and that of the femto cell, or the Home NodeB of the femto cell, may be considered to be approximately the same. Clearly, this is only applicable if the wireless communication unit is within range of the femto cell, i.e. if a wireless communication unit is able to detect a femto cell. Thus, a method is provided that enables the geographical location of a wireless communication unit to be determined with greater accuracy than traditional techniques that rely on macro cell data measurements.

As will be appreciated by a skilled artisan, a trend has been identified whereby femto cells are being installed where traditional macro cellular RF coverage is poor. In locations where macro cellular RF coverage is poor, geo-location accuracies using traditional macro cellular measurements may be particularly poor. Accordingly, enabling the geo-location of wireless communication units using femto cells in this manner is of particular benefit.

Figure 1:
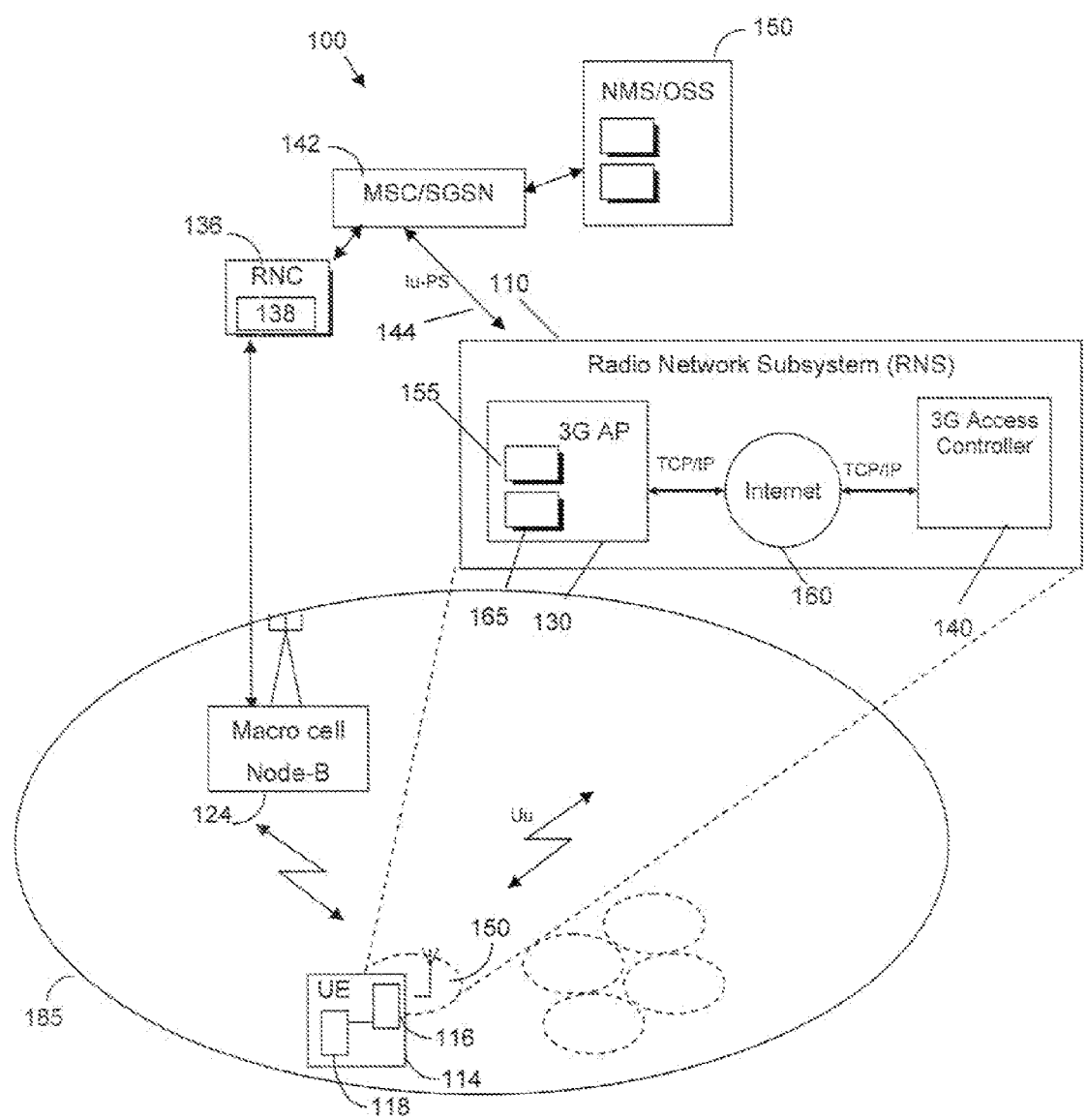
FIG. 1 is a schematic diagram, illustrating a simplified example of a part of a cellular communication network.

Referring now to the drawings, and in particular FIG. 1, an example of part of a cellular communication system 100, is illustrated. The network of the cellular communication system 100 is adapted in accordance with an example embodiment of the invention. The example illustrated in FIG. 1 is a communication system in a form of a third generation partnership project (3GPP™) UMTS™ network. Network 100 comprises a combination of a macro cell 185 and a plurality of 3G femto cells 150, in accordance with one embodiment of the invention. For the example embodiment illustrated in FIG. 1, the radio network sub-system (RNS) comprises two distinct architectures, to handle the respective macro cell and femto cell communications.

In the macro cell scenario, the RNS comprises a controller in the form of a Radio Network Controller (RNC) 136. RNC 136 has, inter alia, signal processing logic 138. The RNC 136 is operably coupled to a macro NodeB 124 for supporting communications within the macro cell 185. The RNC 136 is further operably coupled to a core network element 142, such as a serving general packet radio system (GPRS) support node (SGSN)/mobile switching centre (MSC), as known.

In a femto cell scenario, an RNS 110 comprises a network element, which for the illustrated example embodiment is in a form of a 3G Home NodeB (HNB) 130. The HNB 130 is arranged to perform a number of functions generally associated with a base station.

The RNS 110 further comprises a controller in the form of a 3G Access controller 140. As will be appreciated by a skilled artisan, a Home NodeB (HNB), also referred to as a femto access point, is a communication element that supports communications within a communication cell, such as a 3G femto cell 150. So the HNB 130 provides access to a cellular communication network via the 3G femto cell 150. An HNB 130 may be purchased by a member of the public and installed in their home. The HNB 130 may then be connected to a 3G Access Controller 140 over the owner's broadband internet connection 160.

Thus, a 3G HNB 130 may be considered as encompassing a scalable, multi-channel, two-way communication device. The 3G HNB 130 may be provided within, say, residential and commercial (e.g. office) locations, 'hotspots' etc, to extend or improve upon network coverage within those locations.

There are no standard, defined criteria for the functional components of a 3G HNB. However, an example of a typical HNB for use within a 3GPP system may comprise some traditional macro NodeB functionality, and some aspects of the radio network controller (RNC) 136 functionality. For the illustrated embodiment, the HNB 130 comprises transceiver circuitry 155 arranged to enable communication with one or more wireless communication units. Those wireless communication units must be located within the general vicinity of the communication cell 150, and in particular within the communication cell 150. An example of such a wireless communication unit would be User Equipment (UE) 114, connected via a wireless interface (Uu).

The 3G Access Controller 140 may be coupled to the core network element 142 via an Iu interface 144, as shown. In this manner, the HNB 130 is able to provide voice and data services to a cellular handset, such as UE 114, in a femto cell. These services are provided in the same way as a conventional macro NodeB, but with the deployment simplicity of, for example, a Wireless Local Area Network (WLAN) access point.

For the illustrated example of FIG. 1, the cellular communication network further comprises one or more network management systems (NMS) and/or operational support systems (OSS). These are illustrated generally at 150. Such systems may typically support, for example, processes such as maintaining network inventory, provisioning services, configuring network components, managing faults, etc.

Figure 2:
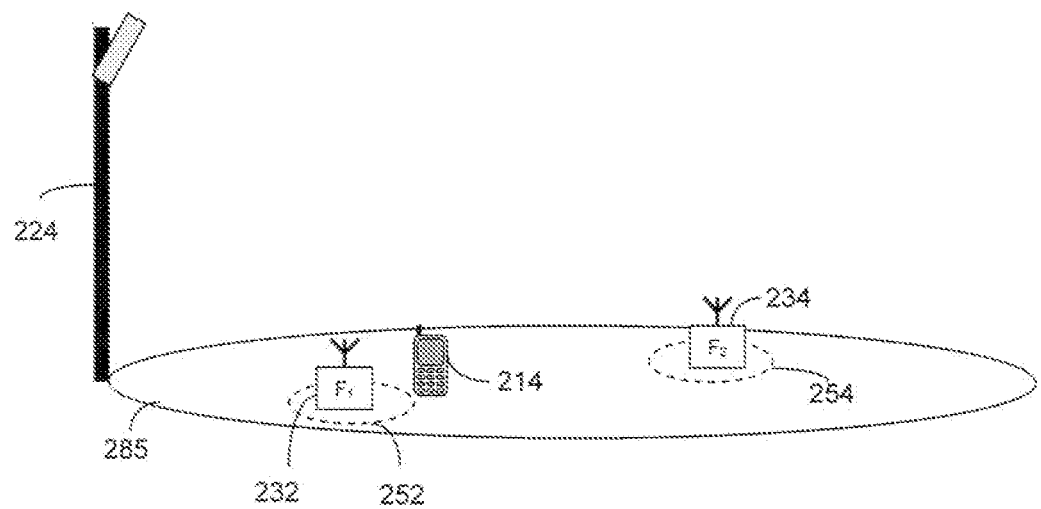
FIG. 2 is a schematic diagram, illustrating a simplified example of the location of femto cells within a footprint of any overlying macro cell.

FIG. 2 illustrates the limited range of Femto cells. Due to their limited range, femto cells typically reside within the larger footprint of at least one macro cell.

FIG. 2 illustrates schematically:

(i) The distance between a wireless communication device 214 and the NodeB 224 that supports the macro cell 285; and (ii) The distance between the wireless communication device 214 and HNBs 232 and 234. HNB 232 supports a first femto cell 252 within the footprint of the macro cell 285. HNB 234 supports a second femto cell 254, which is also within the footprint of the macro cell 285. These distances vary, depending on the particular location of the wireless communication device 214 within the footprint of the macro cell 285.

Due to the limited range of femto cells 252 and 254, the wireless communication device 214 must be in close proximity to one of the HNBs 232 or 234 in order for the wireless communication device 214 to be able to observe a femto cell 252 or 254. Here 'close proximity' may be typically within, 50 meters. Accordingly, if a femto cell 252 or 254 observed by a UE 214 can be identified, the geographical location of the UE 214 may be determined to be approximately that of the HNB 232 or 234 supporting that femto cell.

However, a large number of femto cells have already been deployed in real world networks. An even greater number are anticipated to be deployed in the future. As specified above, conventional methods for identifying macros cells do not apply to femto cells. In particular, Primary Scrambling Codes (PSCs), which conventionally enable macro cells to be identified, are typically shared by many femto cells within a location area. Thus, a PSC cannot be used to differentiate between different femto cells.

However, the inventors of the present invention have identified that timing offset data for femto and macro cells observed by a UE may be used to differentiate between femto cells within the footprint of a macro cell. In particular, the inventors have identified that an observed timing difference between an observed macro cell timing offset, and an observed femto cell timing offset, can be used. This observed timing difference provides a means by which a femto cell may be differentiated from one or more other femto cells within the same macro cell footprint. This approach may thus enable femto cells within a macro cell footprint to be identified.

Figure 3:
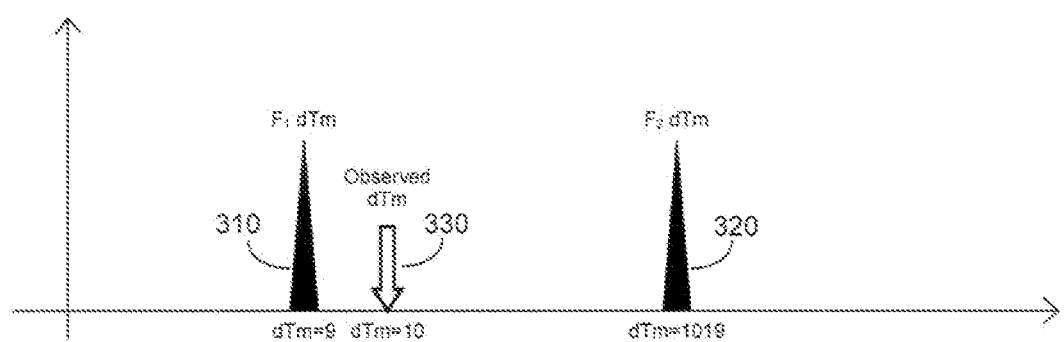
FIG. 3 is a schematic diagram, illustrating a simplified example of observed timing differences for the cells of FIG. 2.

FIG. 3 illustrates an example of the use of such an observed timing difference to identify a femto cell 252 or 254 within the footprint of the macro cell 285. As is well known within cellular communication networks such as a UMTS network, UEs provide measurement reports to the network. Such reports comprise measured data for observed cells, including both femto and macro cells. The data typically comprises signal strength measurements and timing offset values for the observed cells. These timing offset values provide an indication of a signal delay between the UE the femto and macro cells. Accordingly, when the UE 214 illustrated in FIG. 2 comes into range of femto cell 252, it provides a measurement report. That measurement report will comprise measurement data, including timing offset data for:

(i) femto cell 252; and (ii) macro cell 285, within which femto cell 252 is located.

In this example, macro cell 285 may be referred to as the 'overlying macro cell'. In FIG. 2, both first femto cell 252 and second femto cell 254 lie wholly within macro cell 285. However, a femto cell may lie at the outer periphery of the coverage area of macro cell 285. For such a femto cell, some part of the coverage area of the femto cell may lie outside the coverage area of macro cell 285. In such a case, only a part of the femto cell can be described as lying within macro cell 285. This is more likely for femto cells of comparatively greater size, and some femto cells may cover an area of up to a few hundred meters or more. A UE 214 will only be able to provide a measurement report to the network with timing offset data for both the femto cell and the macro cell, when it is within the part of the femto cell from which it can also see HNB 224 of the macro cell.

Upon receipt of a measurement report, comprising measurement data for a first femto cell 252 and second femto cell 254, an observed timing difference may be determined. The timing difference is based at least partly on the observed timing offset data for the femto cell 252 or 254, and the overlying macro cell 285. For example, the observed timing data provided within the measurement report may comprise an observed timing offset value for each observed of one or more macro cells, and in particular for the observed femto cell 252 or 254 and the overlying macro cell 285.

An observed timing difference value may be determined for the observed femto cell 252 or 254 and the overlying macro cell 285 by subtracting one of the timing offset values therefor from the other. For example, an observed timing difference value may be calculated by subtracting, say, the observed timing offset value for the overlying macro cell 285 from the observed timing offset value for the observed femto cell 252 or 254. If the following notation is used:

'dTm' for the observed timing difference value

'Tm_macro' for the observed timing offset value for the overlying macro cell

'Tm_femto' for the observed timing offset value for the observed femto cell 252 or 254.

Then the observed timing difference value (dTm) may be expressed as:

$$dTm = Tm\_femto - Tm\_macro \qquad [\text{Eq. 1}]$$

Due to the limited range of femto cells, the observed timing offset value Tm_femto for an observed femto cell 252 or 254 will typically be relatively consistent within a small window of time. This means that dTm will not vary significantly at a particular femto cell, due to the limited range of the femto cell. However, different femto cells will tend have different dTm values.

The exact value of Tm_macro will usually be different at femto cell 252, than the value of Tm_macro observed at femto cell 254. This is because femto cell 252 and femto cell 254 are likely to be at different distances from NodeB 224 of the macro cell. What is important is that the dTm value will almost always be different at femto cell 252 compared to femto cell 254.

The femto cells are likely to have substantial timing drift, compared to macro cells, because the femto cells are consumer electronic devices. The more expensive macro cells can afford to have expensive timing references, such as ovenized oscillators and sophisticated frequency lock loops. However, the femto cells typically have less accurate timing references. The drift of the timing reference of a femto cell, can be tracked over time. The timing reference can then still be used to distinguish one femto cell from another.

The inventors have thus recognized that the observed timing difference value dTm for an observed femto cell 252 or 254 and an overlying macro cell 285 is capable of providing a defining characteristic for each femto cell 252 or 254. This defining characteristic can be used as a differentiating characteristic between each of the femto cells in a macro cell, so serves as an identifier of the femto cell.

The actual values of the offsets themselves such as Tm_femto and Tm_macro are defined by the 3GPP standards. These offsets are the time offset, between:

(i) The observed start of a 10 millisecond radio frame, transmitted by a cell in question, and as received by the wireless mobile device; and (ii) The 10 millisecond timing reference used by the UE.

The macro cell may, for example, provide a time stamp embedded in a communication that is sent to the wireless communication unit. The wireless communication unit will however see that time stamp as being offset from the timing reference used in the wireless communication unit, by an amount that depends on two parameters, as follows:

(i) One parameter is the amount by which the timing provided by timing circuitry in the NodeB differs from the timing reference used in the wireless communication unit. If, for example, the wireless communication unit has an 'absolute' time reference available, such as the correct time for the time zone in which it is located, the timing circuitry within the Node B is likely not to provide exactly this absolute time. The time stamp inserted by the NodeB in a communication to the wireless communication unit will thus differ correspondingly from the 'absolute' time reference used by the wireless communication unit.

(ii) The other parameter is the time for the communication to travel from the location of the NodeB 224 to the wireless communication unit 214. For a wireless communication unit within the footprint of one femto cell such as femto cell 252, the distance to the NodeB of the macrocell varies little across the footprint of the femto cell.

The measurement unit for the offsets is the 'chip'. UMTS has a chip rate of 3.84 Million chips per second. The unit of a chip is a thus a duration of 1/3.84 microseconds=260.4 nsec So the timing offset values represent the number of "chips" in a 10 msec radio frame, and hence vary between 0 and 38399. So a measurement may yield one of 38400 possible Tm values. This is 3.84e6*10 e-3=38400. Accordingly, a corresponding observed timing difference dTm, between the timing offset of a femto cell and the timing offset of a macro cell, may also vary from 0 to 38399.

It is important to note that the Tm offset values are expressed modulo 38400. This is because the addition of an integer multiple of 38400 chips, such as 38400 or 76800 chips, does not change the relative location of the 10 millisecond timing boundaries. Examples of the value that a timing difference may take are therefore 0, 1, 2, 3, ..., 38399.

The input values of Tm on the right side of equation 1 are therefore given modulo 38400, for a UMTS system. So the output values of dTm on the left of equation 1 will also be expressed as a value between 0 and 38399. That is, this difference value of dTm is also expressed modulo 38400.

In fact, an arbitrary offset can also be introduced. This could be arranged to lead, for example, to an output value is expressed as a value between −19200 and 19199. This example would still provide a total range of 38400, and be expressed modulo 38400. However, this allows negative numbers as well as positive numbers. In this latter approach, some example dTm values include: 0, 1, −1, 2, −2, 3, −3, etc.

Considering again the example illustrated in FIGS. 2 and 3:

(i) NodeB 224 supports the overlying macro cell 285;

(ii) First femto cell F1 252 may be located relatively close to NodeB 224; and (iii) Second femto cell F2 254 may be located further away from NodeB 224.

There will be no relationship between physical proximity and dTm values. Variability in dTm values will be driven mostly by the random timing initialization and timing drifts in the femto cell oscillators. The observed dTm value at the first femto cell 252 is a function of femto cell clock initialization and femto cell clock drift. For example, it might take a value of, say, '9 chips' at a particular point in time. This is illustrated below icon 310 in FIG. 3.

The value of dTm for femto cell 254 relative to NodeB 244 will generally be quite different than that for femto cell 252 (relative to NodeB 244) due to different clock initialization and subsequent clock drift. For example, it might take a value of, say, '1019 chips'. This is illustrated below icon 320 in FIG. 3.

When a UE 114 within overlying macro cell 285 comes into range of an unknown femto cell, e.g. femto cell 252, the femto cell can be identified. If reference data is available for the femto cells, the identification is achieved by comparing the measured timing offset with the reference data. The observed femto cell is identified as that femto cell within the overlying macro cell 285 that has a reference timing difference value closest to the observed timing difference value.

For example, when the UE 114 comes into range of an unknown femto cell in macro cell 285, assume that the observed timing difference value is '10 chip periods'. This is illustrated under arrow 330 on FIG. 3. This observed timing difference value may then be compared to reference timing difference data comprising, for example, reference timing difference values for all femto cells within the overlying macro cell 285. Examples of these are the DTm=9 and DTm=1019 in FIG. 3.

For the example illustrated in FIG. 3, the closest reference timing difference value to the observed value of '10 chips' is the value '9 chips', illustrated at 310 for femto cell 252 F1. Having found the reference timing difference value to which the observed timing difference value is closest, the observed femto cell 252 has clearly been identified.

As will be appreciated by a skilled artisan, a wireless mobile communication device will not always be in range of a femto cell. However, when it is, the identity of the femto cell can be used as a proxy for the location of the wireless mobile communication device. The location of the femto cell is assumed to be known.

Accordingly, a method for determining the geographical location of a wireless mobile communication device may be performed in response to receiving an indication from the wireless mobile communication device of the presence and identity of a femto cell. For example, one or more primary scrambling codes (PSC) within a code division multiple access (CDMA) cellular network, such as a UMTS network, are typically assigned for use within femto cells. These codes are henceforth termed 'femto PSCs'. Accordingly, the method for determining the geographical location of a wireless mobile communication device may be performed in response to the receipt of a measurement report from the wireless mobile communication device, comprising observed timing data for at least one cell using such a femto PSC.

The method of the invention leads to an identity of a femto cell than can be used in hand-in of an ongoing call. As an illustrative example, assume that a wireless communication device is within range of HNB 224 of macro cell 285, and that a call to or from wireless communication device 214 is being supported by macro cell 285. If wireless communication device 214 moves within range of femto cell 254, then the method described above allows identification of femto cell 254. This information then allows wireless communication device 214 to attempt to hand in the ongoing call to femto cell 254. As part of this process, a lookup may be performed between the observed timing difference dTm information and a list containing one or more unique, unambiguous femto cell name(s). The extracted name is used to coordinate the hand-in in an efficient manner.

If other requirements are met, for example that femto cell 254 has sufficient capacity, then the ongoing call may be handed in to the identified femto cell, seamlessly. One advantage of this may be a stronger signal for wireless communication device 214. Another advantage may be that capacity is freed up for HNB 224 to support another call elsewhere within macrocell 285, from a different wireless communication device that is not shown in FIG. 2. A further advantage may be the ability to efficiently and unambiguously hand-in to an identified femto cell from the macro network, using mobiles and network elements that are compliant with existing standards One way of linking the femto cell name or label with the time difference (dTm) information, including femto cell location, is to use hand-off information from previous calls. This is obtained at the time when a wireless communication device is in hand off. This may be a call that a wireless communication device had initiated via the femto cell, but which is then handed off to the macro cell as the wireless communication device moves away from the femto cell. As that hand off occurs, the OSS 150 can match the current timing difference data from the wireless communication device measurement report to the identity of the femto cell that has been supporting the call, since both pieces of information are on the measurement report.

However the list of femto cells and their names is obtained, the method of call hand-in may rely on a starting femto cell configuration file, including femto cell names or labels. Clearly, a lookup mechanism is required, for the mobile whose call is about to be handed-in. Thus the femto cell identification of the invention may provide an exact indication of the identity of a femto cell, to which an ongoing call should be handed in.

Timing reference data can be derived by a process of mapping difference values for femto cells, in relation to individual overlying macros cells. This mapped timing reference data may then be used to facilitate the identification of the femto cells. A method of mapping the timing reference data is the subject of U.S. application Ser. No. 13/173,950, now U.S. Pat. No. 8,626,176, entitled Method and Apparatus for Deriving Femto Cell Timing Information by Michael J. Flanagan that is filed currently herewith and incorporated by reference in its entirety.

For example, as discussed in U.S. application Ser. No. 13/173,950, now U.S. Pat. No. 8,626,176, observed femto and macro cell timing data, and geographical location information received from UEs, may be used to map central tendency timing difference and geographical location values for femto cells. Such mapped data may then be stored (set) within a memory element. That mapped data serves as reference information. The reference information is available for subsequent use. One use is to enable the identification of femto cells, by another wireless communication device that moves into the footprint of one of the femto cells. The method described above may be used to provide reference timing information for one or more femto cells, when no reference timing information was previously available. However, there also may be a need to update such information.

Due to the need to produce low cost HNB devices, femto cells are likely to have timing references that drift significantly over time, relative to the NodeBs of the more stable macro network. Accordingly, the timing difference values for a femto cell and an overlay macro cell are also likely to drift over time. Mapped timing difference data for femto cells may therefore need to be updated, in order to compensate for such drift.

For example, as previously mentioned, observed timing data for femto cells and the macro cells may be received from wireless communication units, and used to determine observed timing difference values based (at least partly) on the observed timing data. Such observed timing difference values may then be compared with previously received mapped timing difference data. Such observed timing difference values may be then retained, for example stored, for subsequent use as reference timing difference information, to compensate for drift within the timing references of the femto cells. However those skilled in the art will recognize that reference timing data may be obtained by any method, and the method shown in the above application is not the only possible solution.

Accordingly, it is contemplated that the method for identifying a femto cell may comprise:

(i) Identifying the overlying macro cell, for example using the PSC and a location area code (LAC) of that macro cell; and (ii) Comparing an observed timing difference value to mapped timing difference values for femto cells within the identified macro cell.

Furthermore, a wireless communication device such as UE 214 is typically within range of more than one macro cell. Accordingly, a measurement report from a wireless communication device may comprise observed timing data for more than one macro cell. It is therefore contemplated that the method for identifying a femto cell herein described may be performed for the, or each, observed femto cell, in relation to one or more observed macro cells. For example, in some embodiments of the present invention, where at least one femto cell and more than one macro cell are observed by a wireless communication device, the method for identifying a femto cell herein described may comprise determining a most appropriate overlying macro cell, with which to determine an observed timing difference value, for the at least one observed femto cell. For example, the most appropriate overlying macro cell may comprise a macro cell indicated as having the strongest signal strength for the UE.

Alternatively, in some example embodiments of the present invention, the method for identifying a femto cell herein described may comprise determining observed timing difference values for the at least one observed femto cell in relation to a plurality of observed macro cells. For example, the method may comprise determining observed timing difference values between the at least one femto cell and each macro cell indicated as having a signal strength for the UE above a threshold value. The observed timing difference value for each overlying macro cell may then be compared to reference timing difference values for the respective overlying macro cells, in order to determine a possible identity of the observed femto cell therefrom. In case of a discrepancy between the femto cell identities determined from the reference data of the different macro cells, a confidence score or weighting value may be assigned to each macro cell, and/or determined femto cell identity. This assignment may be made, for example, based on signal strength measurements, number of 'votes' for each identity, etc. A 'most likely' identity may then be determined based on the confidence scores/weighting values.

Thus, a method for identifying a femto cell has been described, wherein an observed timing difference for a femto cell is compared to reference timing difference values associated with femto cells within an overlying macro cell. This may lead to both the identification of a femto cell, and the geographical location of a wireless communication device. Such a method may be implemented by way of computer-readable code executed within one or more network elements of the cellular communication network 100. For example, it is contemplated that method for identifying a femto cell herein described may be performed substantially anywhere within the cellular communication network 100 that timing data received from a UE is made available, and where reference timing difference data for macro cells is also made available.

The method may be implemented within the NMS/OSS 150 part of the network 100, for example by way of a computer-readable code such as a software subroutine stored within a memory element 152 of the NMS/OSS 150 and executed on a signal processing module 155 thereof.

In its most general sense, the method of identifying a femto cell may be implemented within a network element, which is part of the network of the communication system, or in a wireless mobile communication device itself. The network element may comprise at least one signal processing module arranged to determine at least one timing difference, the at least one timing difference being observed for communications between a wireless communication unit and each of a femto cell and at least one macro cell, and arranged to compare the at least one observed timing difference to reference timing difference data, to identify the femto cell.

The network element may be arranged to set a location of the identified femto cell as a geographical location for the wireless communication unit, which may involve accessing a network configuration file, the network configuration file comprising latitude and longitude data for the at least one femto cell. The network element may be arranged to hand-in an on-going call from a macro cell to the identified femto cell, which may involve accessing a femto cell configuration file, the femto cell configuration file comprising information identifying femto cells, including femto cell names or labels.

Figure 4:
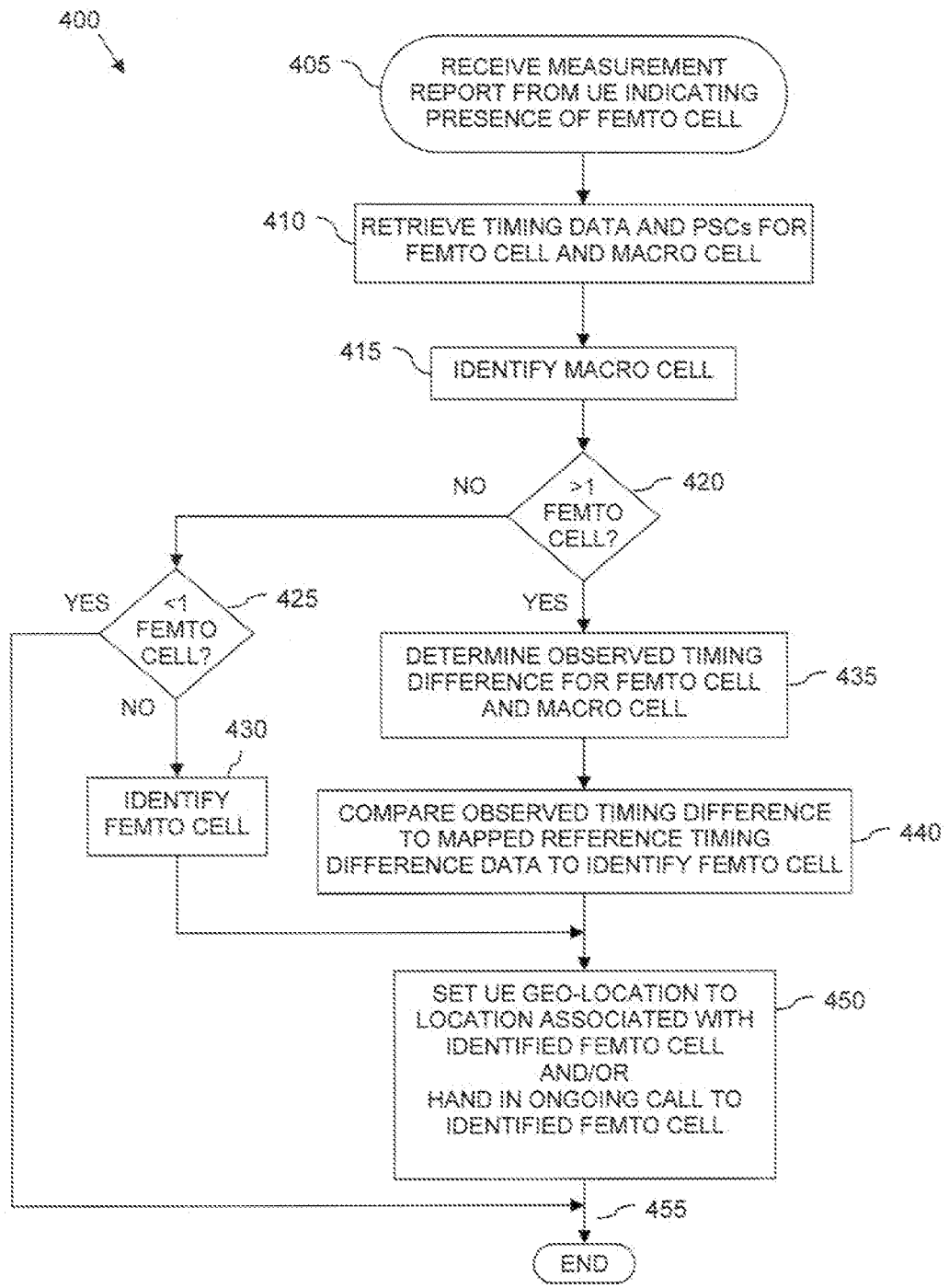
FIG. 4 is a simplified flowchart of an example of a method for determining the identity of the femto cell

Referring now to FIG. 4 there is illustrated a simplified flowchart 400 of an example of a method for identifying a femto cell according to some embodiments of the present invention.

The method of FIG. 4 starts at step 405 with the receipt of a measurement report from a UE indicating the presence of a femto cell. For example, the presence of a femto cell may be indicated by way of the measurement report comprising data for a cell using a femto PSC.

Next, at step 410, timing data for the femto cell and one or more overlying macro cells is extracted from the measurement report. The, or each, overlying macro cell for which timing data has been extracted from the measurement report is then identified. For example, this may be based on a PSC and LAC for the macro cell.

Next, for the, or each, overlying macro cell, it is determined at 420 whether than more than one femto cell is known within the overlying macro cell. This decision may utilise mapped data for the overlying macro cell. If the answer is 'yes', then the method proceeds to step 435. If the answer is 'no', then the method proceeds to step 425.

In step 425, it is determined whether at least one femto cell has been mapped within the overlying macro cell. If no femto cell is known the overlying macro cell, then the method proceeds to step 455, and the method ends.

If a single femto cell is known, for example has been mapped within the overlying macro cell, the method moves on to step 430. In step 430, the identity of the observed femto cell is set to that of the single mapped femto cell. The method then proceeds to step 450. Referring back to the alternative path from step 420, step 435 involves determining an observed timing difference for the observed femto cell, and overlying macro cell. After step 435, at step 440, the observed timing difference is then compared to reference timing difference values for the overlying macro cell, to identify the observed femto call.

Having identified the observed femto cell, at 430 or 440, the method moves on to step 450. However, the method of the invention may stop at either step 430 or 440, having achieved identification of the femto cell. Step 450 is provided on FIG. 4 in order to illustrate two possible applications of the identification details of the femto cell.

In step 450, one or both of two actions may occur, as follows:

(i) The geographical location of the wireless communication device may be set to a geographical location associated with the identified femto cell.

(ii) An ongoing call may be handed in from the wireless communication unit to the identified femto cell. At step 455, the method ends.

The methods herein described use reference timing difference data to identify the at least one femto cell. Such mapped data may be generated or otherwise obtained in any suitable manner. For example, it is contemplated that such mapped timing differential data may be collected through drive tests or the like. These tests detect and map the location of femto cells within macro cell footprints, and obtain corresponding femto and macro timing data therefore, from which timing difference values may be determined.

However, such drive test data collection involves a wireless communication device that can measure its position accurately, and that device has to be taken through the macro cell, making measurements. Such a process is expensive. Further, the drifting timing values may rapidly make drive test data collections obsolete.

Accordingly, it is contemplated that such data may be collected and mapped using alternative methods. For example, one such alternative method may be through the use of UEs comprising Global Positioning System (GPS) functionality, whereby upon detection of a femto cell, such UEs may be requested/instructed to provide geographical location information, femto and macro cell timing offset information, etc. This may be done infrequently, but would nevertheless still be very useful. In this manner, the received information may be used to map the location and timing difference values for femto cells over a period of time. Such mapped data may subsequently be stored within a memory element of the network element implementing the method herein described, such as the memory element 152 of the NMS/OSS 150. A method of updating the mapped timing reference data is the subject of U.S. application Ser. No. 13/173,950, now U.S. Pat. No. 8,626,176.

Figure 5:
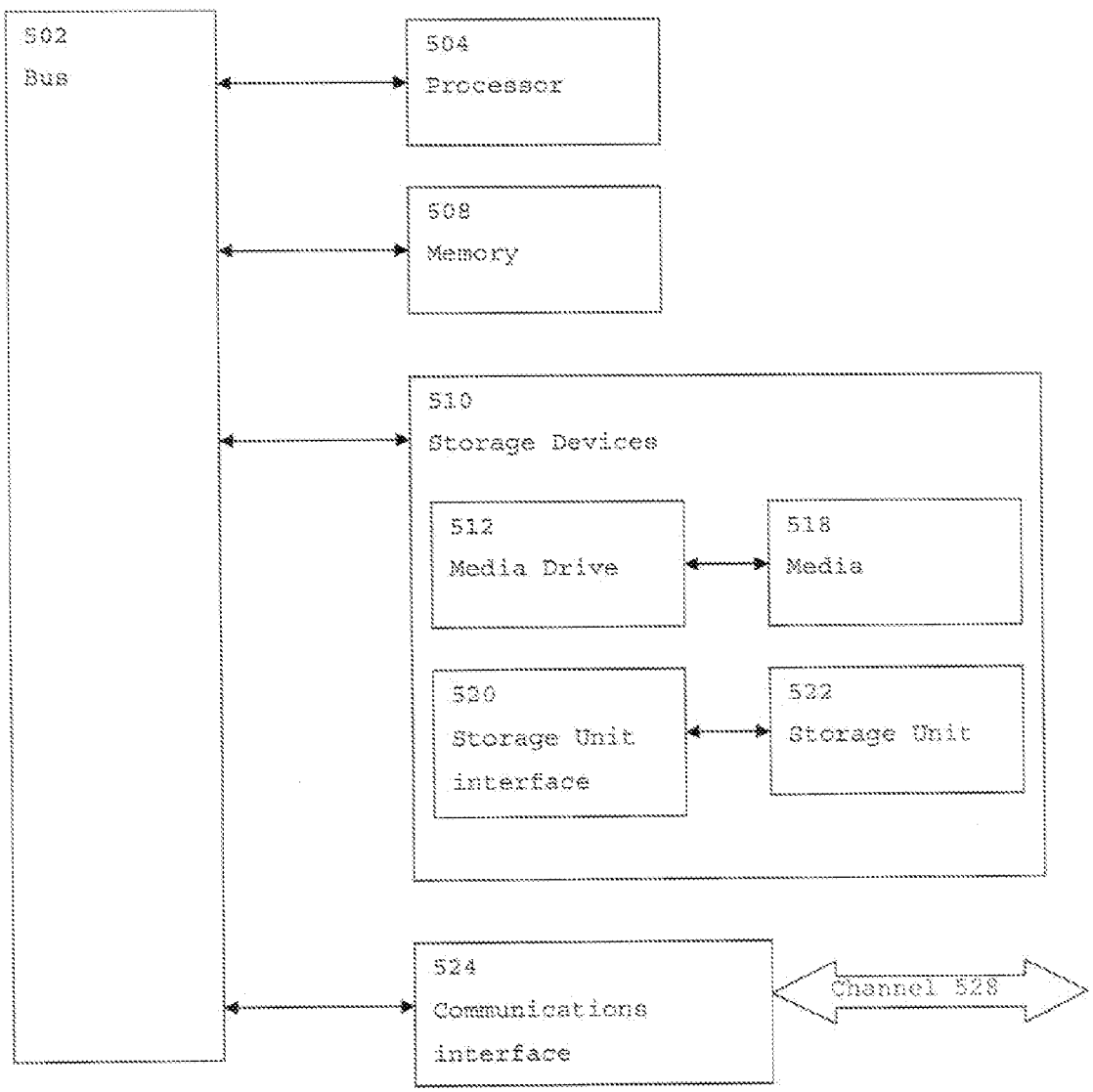
FIG. 5 is a schematic diagram, illustrating a typical computing system that may be employed to implement processing functionality in embodiments of the invention.

Referring now to FIG. 5, there is illustrated a typical computing system 500 that may be employed to implement signal processing functionality in embodiments of the invention. Computing systems of this type may be used in access points and wireless communication units. Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special-purpose processing engine such as, for example, a microprocessor, microcontroller or other control module. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory (ROM) or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 518 may include, for example, a hard disk, floppy disk, magnetic tape, optical disk, CD or DVD, or other fixed or removable medium that is read by and written to by media drive 512. As these examples illustrate, the storage media 518 may include a computer-readable storage medium having particular computer software or data stored therein.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a universal serial bus (USB) port), a PCMCIA slot and card, etc. Software and data transferred via communications interface 524 are in the form of signals which can be electronic, electromagnetic, and optical or other signals capable of being received by communications interface 524.

These signals are provided to communications interface 524 via a channel 528. This channel 528 may carry signals and may be implemented using a wireless medium, wire or cable, fiber optics, or other communications medium. Some examples of a communication channel include a phone line, a cellular phone link, an RF link, a network interface, a local or wide area network, and other communications channels.

In this document, the terms 'computer program product' 'computer-readable medium' and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as 'computer program code' (which may be grouped in the form of computer programs or other groupings), when executed, enable the computing system 500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 522, drive 512 or communications interface 524. The control module (in this example, software instructions or computer program code), when executed by the processor 504, causes the processor 504 to perform the functions of the invention as described herein.

Furthermore, the inventive concept can be applied to any signal processing circuit. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for determining the identity of a femto cell has been described, wherein the aforementioned disadvantages with prior art arrangements have been substantially alleviated. The information on femto cell identity may be used to determine the geographical location of a wireless communication device, and/or to hand in an ongoing call to the identified femto cell.

The invention claimed is:

1. A method comprising:
   determining, by a network device, a first observed timing difference observed for communications between a wireless communication unit and a femto cell associated with a macro cell;

determining, by the network device, a second observed timing difference observed for communications between the wireless communication unit and the macro cell;

calculating, by the network device, a timing difference value based on subtracting one of the first observed timing difference or the second observed timing difference from the other of the first observed timing difference or the second observed timing difference;

comparing, by the network device, the timing difference value to reference timing difference values,
each reference timing difference value being associated with a particular femto cell of a plurality of femto cells associated with the macro cell; and identifying, by the network device, the femto cell, from among the plurality of femto cells, based on comparing the timing difference value to a reference timing difference value, of the reference timing difference values, associated with the femto cell,
the timing difference value being indicative of the femto cell, and
the reference timing difference value being based on mapped data created from data previously obtained by multiple wireless communication units.

2. The method of claim 1, further comprising:
receiving, from the wireless communication unit, observed timing data for the femto cell and the macro cell; and
where determining the first observed timing difference and determining the second observed timing difference includes:
determining the first observed timing difference and the second observed timing difference based on the observed timing data.

3. The method of claim 1, where the first observed timing difference comprises a timing offset value for the femto cell and the second observed timing difference comprises a timing offset value for the macro cell; and
where the method, when calculating the timing difference value, includes:
calculating the timing difference value by subtracting one of the timing offset values from the other.

4. The method of claim 1, where the reference timing difference values are respectfully associated with one or more femto cells located at least partially within the macro cell, and where the method further comprises:
identifying the macro cell with which the wireless communication unit can communicate; and
comparing the timing difference value to reference timing difference values respectfully associated with the one or more femto cells located at least partially within the macro cell.

5. The method of claim 1, where identifying the femto cell includes:
identifying the femto cell by identifying a reference timing difference value, of the reference timing difference values, closest to the timing difference value.

6. The method of claim 1, where determining the second observed timing difference includes:
determining the second observed timing difference based on the macro cell having a strongest signal strength for the wireless communication unit.

7. The method of claim 1, further comprising:
calculating at least one other timing difference value based on the first observed timing difference and at least one other observed timing difference observed for communications between the wireless communication unit and at least one other macro cell indicated as having a signal strength above a threshold value for the wireless communication unit.

8. The method of claim 1, further comprising:
receiving an indication from the wireless communication unit of a presence of the femto cell,
where the femto cell is identified based on the indication from the wireless communication unit of the presence of the femto cell.

9. The method for claim 1, further comprising: receiving a measurement report from the wireless communication unit,
the measurement report comprising observed timing data for at least one femto cell using a femto cell primary scrambling code,
where the femto cell is identified based on the measurement report.

10. The method of claim 1, where the wireless communication unit uses a geo-location subsystem to identify a current location; and
the current location is stored together with data indicating the first observed timing difference measured at the current location.

11. The method of claim 1, further comprising:
setting a geographical location of the femto cell as a geographical location for the wireless communication unit based on identifying the femto cell.

12. The method of claim 1, further comprising:
handing in an on-going call from the wireless communication unit to the femto cell based on identifying the femto cell.

13. A network device comprising:
one or more processors to:
determine a first observed timing difference observed for communications between a wireless communication unit and a femto cell associated with a macro cell;
determine a second observed timing difference observed for communications between the wireless communication unit and the macro cell;
calculate a timing difference value based on subtracting one of the first observed timing difference or the second observed timing difference from the other of the first observed timing difference or the second observed timing difference;
compare the timing difference value to reference timing difference values,
each reference timing difference value being associated with a particular femto cell of a plurality of femto cells associated with the macro cell; and
identify the femto cell, of the plurality of femto cells, based on comparing the timing difference value to a reference timing difference value, of the reference timing difference values, associated with the femto cell,
the timing difference value being indicative of the femto cell, and
the reference timing difference value being based on mapped data created from data previously obtained by multiple wireless communication units.

14. The network device of claim 13, where the one or more processors are further to:
set a location of the femto cell as a geographical location for the wireless communication unit.

15. The network device of claim 14, where the one or more processors are further to:
access a network configuration file,
the network configuration file comprising latitude and longitude data for the femto cell.

16. The network device of claim 13, where the one or more processors are further to:
  hand-in an on-going call from the macro cell to the femto cell based on identifying the femto cell.

17. The network device of claim 16, where the one or more processors are further to:
  access a femto cell configuration file,
    the femto cell configuration file comprising information identifying femto cells, including at least one of femto cell names or femto cell labels.

18. One or more non-transitory computer-readable media storing instructions, the instructions comprising:
  one or more instructions that, when executed by a processor, cause the processor to:
    determine a first observed timing difference observed for communications between a wireless communication unit and a femto cell associated with a macro cell;
    determine a second observed timing difference observed for communications between the wireless communication unit and the macro cell;
    calculate a timing difference value based on subtracting one of the first observed timing difference or the second observed timing difference from the other of the first observed timing difference or the second observed timing difference;
    compare the timing difference value to reference timing difference values,
      each reference timing difference value being associated with a particular femto cell of a plurality of femto cells associated with the macro cell; and
    identify the femto cell, of the plurality of femto cells, based on comparing the timing difference value to a reference timing difference value, of the reference timing difference values, associated with the femto cell,
      the timing difference value being indicative of the femto cell, and
      the reference timing difference value being based on mapped data created from data previously obtained by multiple wireless communication units.

19. The one or more non-transitory computer-readable media of claim 18, where the first observed timing difference comprises a timing offset value for the femto cell and the second observed timing difference comprises a timing offset value for the macro cell.

20. The one or more non-transitory computer-readable media of claim 18, where the femto cell is within the macro cell.

* * * * *